(12) United States Patent
Soh et al.

(10) Patent No.: US 7,667,623 B2
(45) Date of Patent: Feb. 23, 2010

(54) KEY INPUT APPARATUS USING MAGNETIC FORCE, OPERATING METHOD THEREOF, AND COMPUTER-READABLE RECORDING MEDIUM STORING COMPUTER PROGRAMS FOR PERFORMING THE METHOD

(75) Inventors: Byung-seok Soh, Suwon-si (KR); Yoon-sang Kim, Yongin-si (KR); Jun-il Sohn, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 594 days.

(21) Appl. No.: 11/285,191

(22) Filed: Nov. 23, 2005

(65) Prior Publication Data

US 2006/0132446 A1  Jun. 22, 2006

(30) Foreign Application Priority Data

Nov. 25, 2004   (KR) .................... 10-2004-0097597

(51) Int. Cl.
*H03M 11/00* (2006.01)

(52) U.S. Cl. ............................ 341/22; 341/32; 341/20; 400/490; 400/491; 200/5 A; 335/205

(58) Field of Classification Search .................. 341/20, 341/22, 32; 400/490, 491; 200/5 A; 335/205, 335/207
See application file for complete search history.

(56) References Cited

U.S. PATENT DOCUMENTS

| | | | | |
|---|---|---|---|---|
| 3,831,730 A * | 8/1974 | Koeppe | ...................... | 400/481 |
| 4,054,944 A * | 10/1977 | Lau | ........................... | 335/207 |
| 4,342,975 A * | 8/1982 | Charpentier | ................ | 335/205 |
| 5,066,951 A * | 11/1991 | Munster et al. | ............... | 341/32 |
| 6,497,521 B1 * | 12/2002 | Lohr | ......................... | 400/491 |
| 6,962,452 B2 * | 11/2005 | Cheng | ........................ | 400/490 |
| 7,230,190 B1 * | 6/2007 | Kwong et al. | ............... | 200/5 A |

* cited by examiner

*Primary Examiner*—Albert K Wong
(74) *Attorney, Agent, or Firm*—Staas & Halsey LLP

(57) ABSTRACT

A method of operating a key input apparatus having one or more pressable keys, and a key input apparatus to perform the method, the method including selectively controlling an electromagnetic force to support at least one of the one or more pressable keys, wherein a height of the at least one pressable key is controlled by selectively supplying electric current to an electromagnet to control the electromagnetic force.

18 Claims, 13 Drawing Sheets

KEY INPUT APPARATUS USING MAGNETIC FORCE, OPERATING METHOD THEREOF, AND COMPUTER-READABLE RECORDING MEDIUM STORING COMPUTER PROGRAMS FOR PERFORMING THE METHOD

CROSS-REFERENCE TO RELATED APPLICATIONS

This application claims the benefit of Korean Patent Application No. 10-2004-0097597, filed on Nov. 25, 2004 in the Korean Intellectual Property Office, the disclosure of which is incorporated herein by reference.

BACKGROUND OF THE INVENTION

1. Field of the Invention

The present invention relates to a key input apparatus such as a keyboard or keypad, and, more particularly, to a key input apparatus using a magnetic force, an operating method thereof, and a computer-readable recording medium storing at least one computer program to perform the method.

2. Description of the Related Art

A key input apparatus may be composed of a single key, or a plurality of keys, such as in the form of a keyboard. The keyboard provides a user interface which allows a user to input data to a computer connected to the keyboard. Accordingly, the keyboard may be used as a data input device of a communication terminal. The communication terminal refers to all kinds of data processing devices, including, for example, general personal computers (PCs) and cellular phones.

Types of conventional key input apparatuses include a purely mechanical type, a form element type, a rubber dome type, a membrane switch type, a capacitor switch type, etc. These types are classified according to the switching mode used.

A conventional key input apparatus appears the same in a busy state and an idle state, thereby suffering from three problems.

First, the conventional key input apparatus fails to provide alternative work space when being used as the key input apparatus. For example, a keyboard connected to a desktop computer generally occupies office work space on a desk. Accordingly, when the work space is narrow and the user does not perform computer work, the office work space is used inefficiently due to the keyboard having keys projected at a fixed height at all times.

Second, among the conventional key input apparatuses, those for which the keys must not protrude very high do not have a good stroke touch. For example, the keys of the keyboard of a laptop computer are low in view of a product feature. Therefore, a user of the laptop computer does not have a good stroke touch.

Finally, a conventional key input apparatus is not a user-oriented device. For example, a user who loves computer games mainly makes use of the cursor (or arrow) keys of a keyboard. As such, the other keys are unnecessarily projected in view of space use efficiency. Further, force applied for a stroke is different according to the user and his/her fingers.

Thus, for the same keyboard, some users feel comfortable with the stroke touch, while others feel uncomfortable with the stroke touch.

SUMMARY OF THE INVENTION

The present invention provides a key input apparatus using a magnetic force to adjust the height of each key.

Further, the present invention provides a key input method of using a magnetic force to adjust the height of each key.

In addition, the present invention provides a computer-readable recording medium storing at least one computer program to cause a key input apparatus to perform the key input method of using a magnetic force to adjust the height of each key.

Additional aspects and/or advantages of the invention will be set forth in part in the description which follows and, in part, will be apparent from the description, or may be learned by practice of the invention.

According to an aspect of the present invention, there is provided a key input apparatus comprising: at least one pressable key; a lower magnetic element to selectively produce a predetermined first magnetic field; an upper magnetic element to support the key and selectively produce a predetermined second magnetic field, thereby applying a repulsive magnetic force to the lower magnetic element; a magnetic controller to generate a magnetic control signal to control the first magnetic field and the second magnetic field; and a key recognizer to recognize a value of the pressed key.

The magnetic controller may generate the magnetic control signal to control the first magnetic field and the second magnetic field based on a stored control value.

The key recognizer may determine an average extent to which the key is pressed in a predetermined period of time. The magnetic controller may generate the magnetic control signal to control the first magnetic field and the second magnetic field based on the determined average extent.

According to another aspect of the present invention, there is provided a method of operating a key input apparatus having at least one pressable key, the method comprising: pressing the key one or more times during a predetermined time; determining an average extent to which the key is pressed in the predetermined time; and generating a magnetic force to support the key according to the average extent.

The determining may comprise detecting position information of a key that is pressed a number of times exceeding a predetermined number; the generating the magnetic force may comprise applying the magnetic force to the key based on the detected position information; and the position information indicates the position of the key in the key input apparatus.

The determining may yield a stroke value based on a stroke force used in pressing the key during the predetermined time; and the magnetic force may be generated according to the stroke value.

According to yet another aspect of the present invention, there is provided a method of operating a key input apparatus having at least one pressable key, the method comprising: storing position information of at least one of the keys intended to be used according to a working environment; recognizing the working environment and reading the position information corresponding to the recognized working environment from the stored position information; and generating a magnetic force to support the key corresponding to the read position information, wherein the position information indicates positions of the keys of the key input apparatus.

According to still another aspect of the present invention, there is provided a method of operating a key input apparatus having at least one pressable key, the method comprising: storing information regarding a magnetic force to be generated for the key according to a working environment; recognizing the working environment and reading the information regarding the magnetic force corresponding to the recognized working environment from the stored magnetic force information; and generating a magnetic force for the key corresponding to the read magnetic force information to support the key.

According to still another aspect of the present invention, there is provided at least one computer readable medium storing instructions that control at least one processor to perform a method of operating a key input apparatus having at least one pressable key, the method comprising: recognizing a working environment and reading position information corresponding to the recognized working environment from stored position information; and generating a magnetic force to support the key corresponding to the read position information, wherein the position information indicates the positions of the keys of the key input apparatus, and the computer readable medium stores the position information of at least one of the keys intended to be used according to the working environment.

According to still another aspect of the present invention, there is provided at least one computer readable medium storing instructions that control at least one processor to perform a method of operating a key input apparatus having at least one pressable key, the method comprising: recognizing a working environment and reading magnetic force information corresponding to the recognized working environment from stored magnetic force information; and generating a magnetic force corresponding to the read information regarding the magnetic force to support the key, wherein the computer readable medium stores the magnetic force information according to the working environment.

According to another aspect of the present invention, there is provided a key input apparatus comprising: at least one pressable key; a first magnetic element to selectively produce a first magnetic field; a second magnetic element to support the key and produce a second magnetic field which repulses the first magnetic field; and a controller to control at least one of the first and second magnetic fields.

According to another aspect of the present invention, there is provided a key input apparatus comprising: one or more pressable keys; wherein at least one of the pressable keys is supported by an electromagnetic force.

According to another aspect of the present invention, there is provided a key input apparatus comprising: one or more pressable keys; wherein a height of at least one of the pressable keys is controlled by a selectively applied electromagnetic force.

According to another aspect of the present invention, there is provided a method of operating a key input apparatus having one or more pressable keys, the method comprising: selectively controlling an electromagnetic force to support at least one of the one or more pressable keys; wherein a height of the at least one pressable key is controlled by selectively supplying electric current to an electromagnet to control the electromagnetic force.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
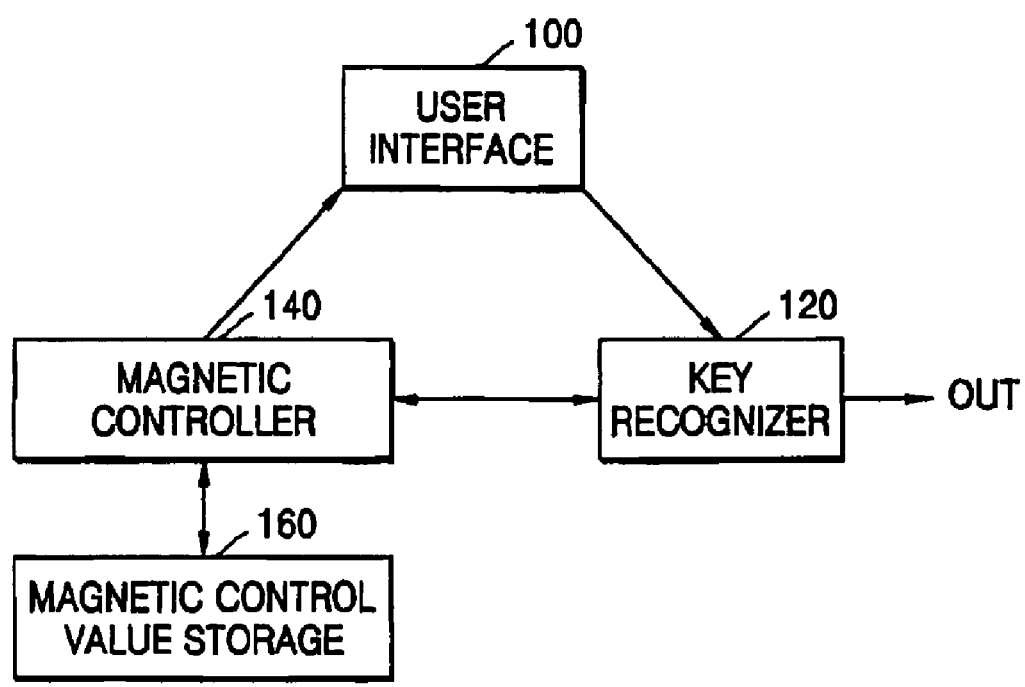
FIG. 1 is a block diagram illustrating a key input apparatus using a magnetic force according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating a key input apparatus using a magnetic force according to an embodiment of the present invention. The key input apparatus includes a user interface 100, a key recognizer 120, a magnetic controller 140, and a magnetic control value storage 160.

The user interface 100 includes at least one key (not shown) which a user is able to press, a lower magnetic element (not shown) which selectively produces a first magnetic field, and an upper magnetic element (not shown) which selectively produces a second magnetic field, resulting in a repulsive magnetic force applied to the lower magnetic element.

Figure 2:
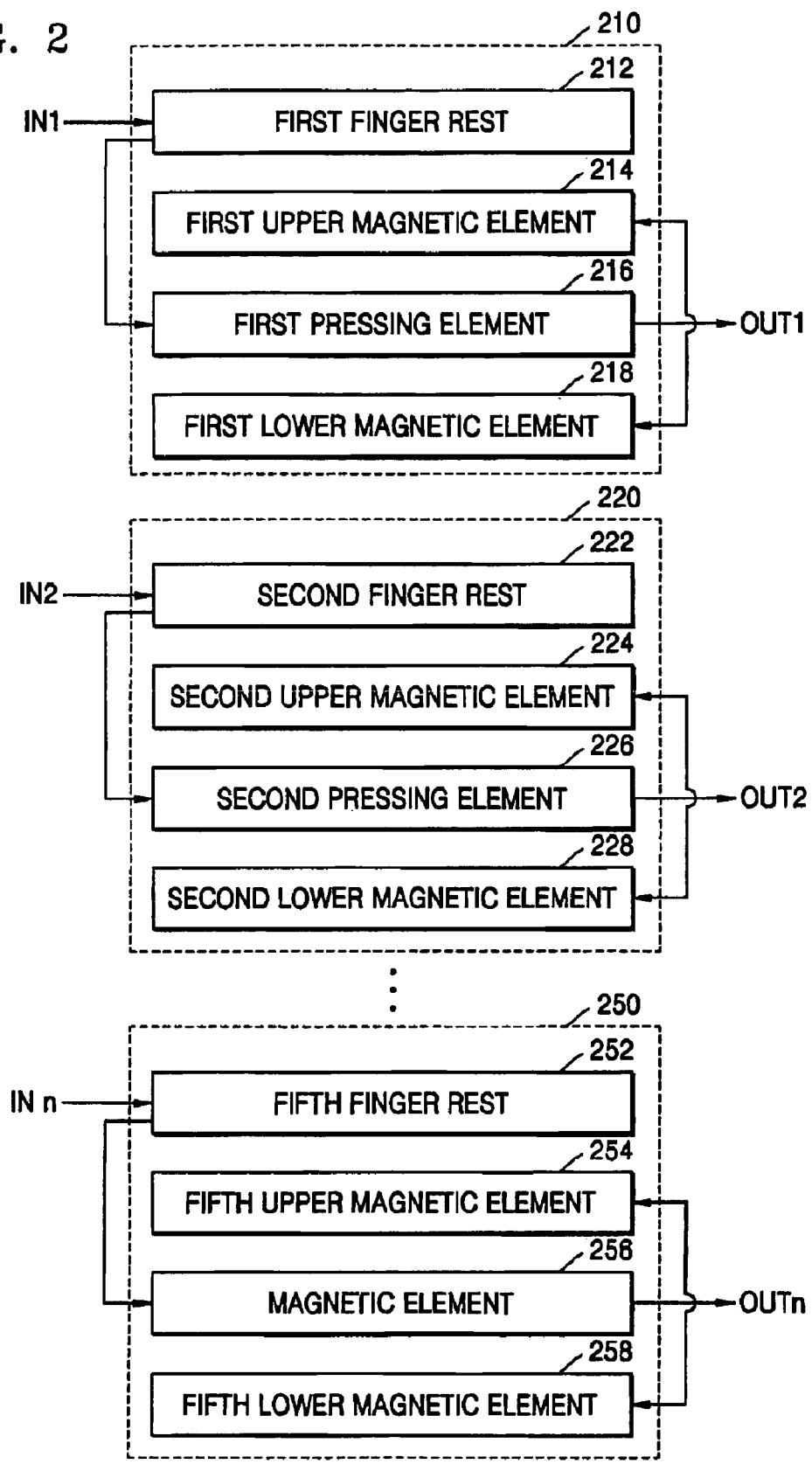
FIG. 2 is a detailed block diagram illustrating the user interface shown in FIG. 1.

FIG. 2 is a detailed block diagram illustrating the user interface 100 shown in FIG. 1, in which the user interface includes n user interface modules, wherein n is a natural number. The embodiment shown in FIG. 2 will be shown to have only five (5) user interface models to facilitate an easier understanding of the present invention, but the user interface 100 could have more or less user interface modules. The user interface modules 210 through 250 are composed of finger rests 212 through 252, upper magnetic elements 214 through 254, pressing elements 216 to 256, and lower magnetic elements 218 through 258, respectively. The finger rests 212 through 252 and the pressing elements 216 through 256 respectively comprise keys. Each of the finger rests 212 through 252 provides a pressable space to the user. Preferably, though not necessarily, the pressable space allows a finger to be rested thereupon.

The first user interface module 210 includes the first finger rest 212, the first upper magnetic element 214, the first pressing element 216, and the first lower magnetic element 218. The first finger rest 212 and the first pressing element 216 comprise a first key.

The first finger rest 212 is pressed with an input force IN1 by the user, and the input force IN1 is transmitted to the first pressing element 216. The first pressing element 216 transmits an output force OUT1 to the key recognizer 120.

Meanwhile, a repulsive magnetic force may exist between the first upper magnetic element 214 and the first lower magnetic element 218. In other words, the first lower magnetic element 218 may selectively produce a first magnetic field, and the first upper magnetic element 214 may selectively produce a second magnetic field such that the first lower magnetic element 218 and the first upper magnetic element 214 have a repulsive force between them.

Each of the second to fifth user interface modules 220 through 250 operates on the same principle as the first user interface module 210, and therefore their descriptions are omitted. The output forces, OUT1 through OUT5 are respectively generated in response to the finger rests 212 to 252 being pressed, and are supplied to the key recognizer 120.

The upper magnetic elements 214 through 254 may be electromagnets, and the lower magnetic elements 218 through 258 may be permanent magnets or electromagnets.

The key recognizer 120 recognizes a value of the pressed key.

The magnetic controller 140 generates magnetic control signals to control the magnetic fields produced by the lower magnetic elements 218 through 258 and the upper magnetic elements 214 through 254.

The magnetic control value storage 160 stores information regarding the magnetic control signals which the magnetic controller 140 generates. The magnetic control value storage 160 may store information regarding the magnetic control signals before the user uses the key input apparatus, and/or a predetermined period of time after the user uses the key input apparatus by determining the extent to which each of the keys is pressed. Herein, the extent is an average extent for the predetermined period of time.

The magnetic control value storage 160 may store position information and current information regarding the keys (not shown) used according to a working environment. For example, if the lower magnetic elements 218 through 258 are electromagnets, the magnetic control value storage 160 stores information regarding which of the lower magnetic elements 218 through 258 are to be supplied with an (electric) current, and information regarding a value of the current to be supplied to the lower magnetic elements 218 through 258 according to the working environment. Similarly, if the upper magnetic elements 214 through 254 are electromagnets, the magnetic control value storage 160 stores position information regarding which of the upper magnetic elements 214 through 254 are to be supplied with an (electric) current, and information regarding the magnitude of current to be supplied to the upper magnetic elements 214 through 254. The position information refers to information regarding the positions of the keys (not shown) of the key input apparatus which the user intends to use.

The working environment is distinguished according to who the user is, what the program operated by the user is, and so forth. For example, the working environments may be divided according to whether the user is a person A or B, whether the program operated by the user is a word-processing program or a game program, and so forth. The magnetic controller 140 recognizes the current working environment from external input, and reads out information regarding a magnetic control signal corresponding to the recognized working environment from the magnetic control value storage 160. If no information regarding a magnetic control signal corresponding to the recognized working environment is stored in the magnetic control value storage 160, the magnetic controller 140 senses the average pressed extent to which each of the keys is pressed for a predetermined period of time after the user uses the key input apparatus for the predetermined period of time, and the magnetic controller 140 generates a magnetic control signal according to the sensed extent. The magnetic control value storage 160 stores information regarding the generated magnetic control signal.

Figure 3:
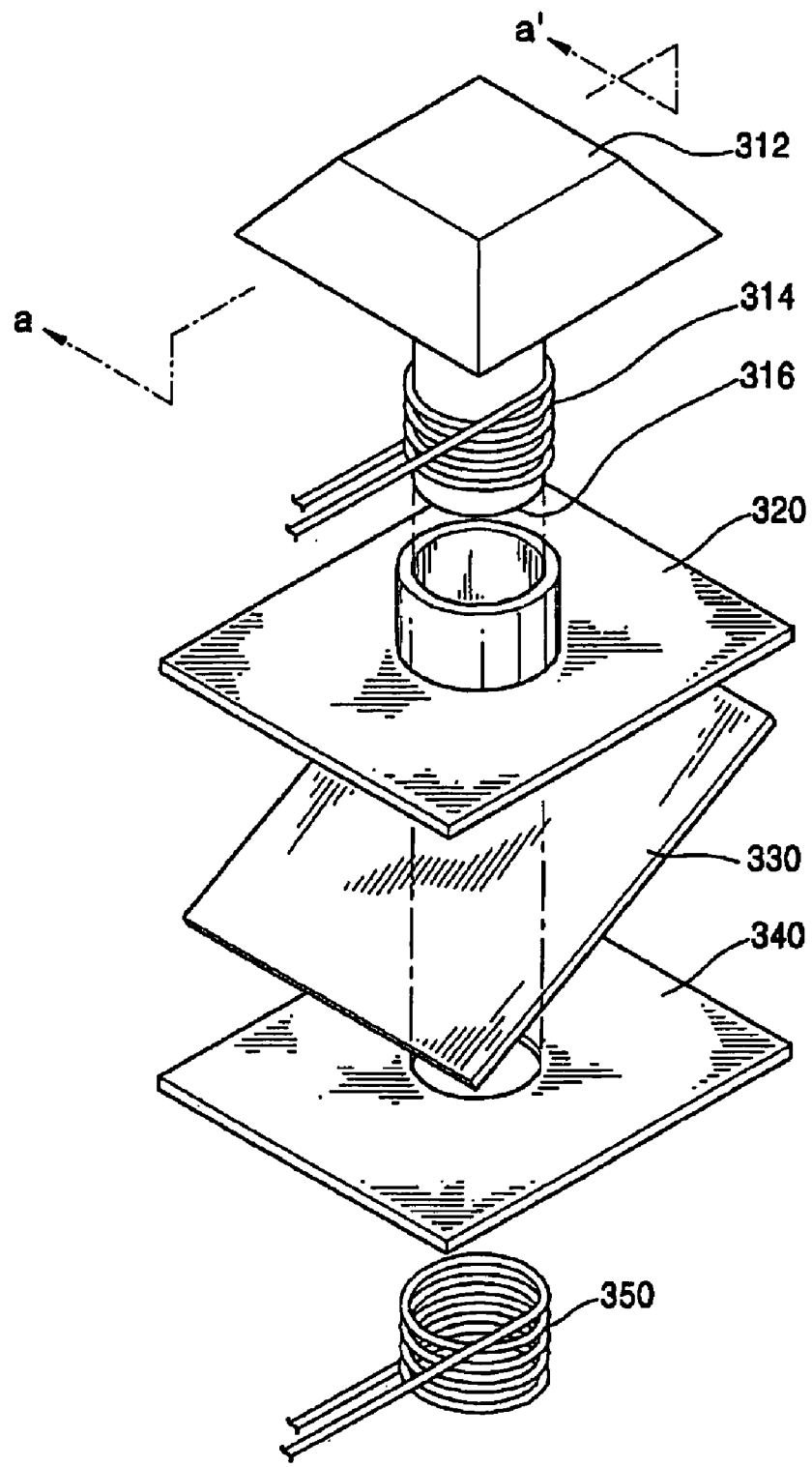
FIG. 3 is an exploded perspective view illustrating an example of the user interface and key recognizer shown in FIG. 1.

FIG. 3 is an exploded perspective view illustrating the user interface 100 and the key recognizer shown in FIG. 1. In FIG. 3, reference number 312 represents the finger rest 212, 222, 232, 242, or 252, reference number 314 represents the upper magnetic element 214, 224, 234, 244, or 254, reference number 316 represents the pressing element 216, 226, 236, 246, or 256, reference number 340 represents the key recognizer 120, and reference number 350 represents the lower magnetic element 218, 228, 238, 248, or 258.

Referring to FIG. 3, a key, including the finger rest 312 providing a pressable space for the user and the pressing element 316, is inserted into a hole formed in a key support 320. The finger rest 312 is preferably, though not necessarily, provided with a space for a user's finger to rest and be able to press the key. The upper magnetic element 314 in this embodiment is an electromagnet.

When the user presses the finger rest 312, the pressing element 316 pushes down a switch 330. As a result, one end of the switch 330 contacts the key recognizer 340. The key recognizer 340 may transmit a signal indicating that the key is pressed to a key recognition unit (not shown) connected to the key input apparatus.

The switch 330 shown in this embodiment is not necessary to implement the present invention. For example, the switch 330 may not be included in an embodiment in which the user presses the finger rest 312 and the pressing element 316 directly contacts the key recognizer 340.

The key recognizer 340 has a hole. A lower magnetic element 350, which is an electromagnet, is disposed under the key recognizer 340.

The magnetic controller 140 controls the (electric) current flowing through the lower and upper magnetic elements 350 and 314. The magnetic controller 140 supplies the current to the lower and upper magnetic elements 350 and 314 such that a magnetic force between the lower magnetic element 350 and the upper magnetic element 314 causes repulsion between the lower magnetic element 350 and the upper magnetic element 314.

The magnetic controller 140 controls the current supplied to the lower and upper magnetic elements 350 and 314, thereby controlling the height to which the key protrudes.

The magnetic fields produced by the lower and upper magnetic elements 350 and 314 penetrate the hole formed in the key recognizer 340.

Figure 4:
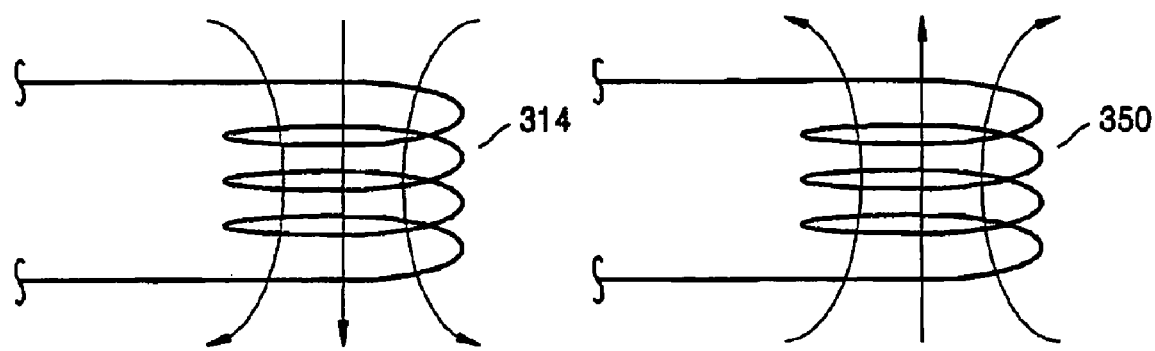
FIG. 4 is a reference diagram illustrating a repulsive force exerted between the upper and lower magnetic elements shown in FIG. 3.

FIG. 4 is a reference diagram illustrating the repulsive force exerted between the upper and lower magnetic elements 314 and 350 shown in FIG. 3.

The upper magnetic element 314 has a south pole directed upward and a north pole directed downward, while the lower magnetic element 350 has a north pole directed upward and a south pole directed downward. Therefore, a repulsive force is exerted between the lower magnetic element 350 and the upper magnetic element 314 when current is applied to the lower magnetic element 350 and the upper magnetic element 314.

Figure 5A:
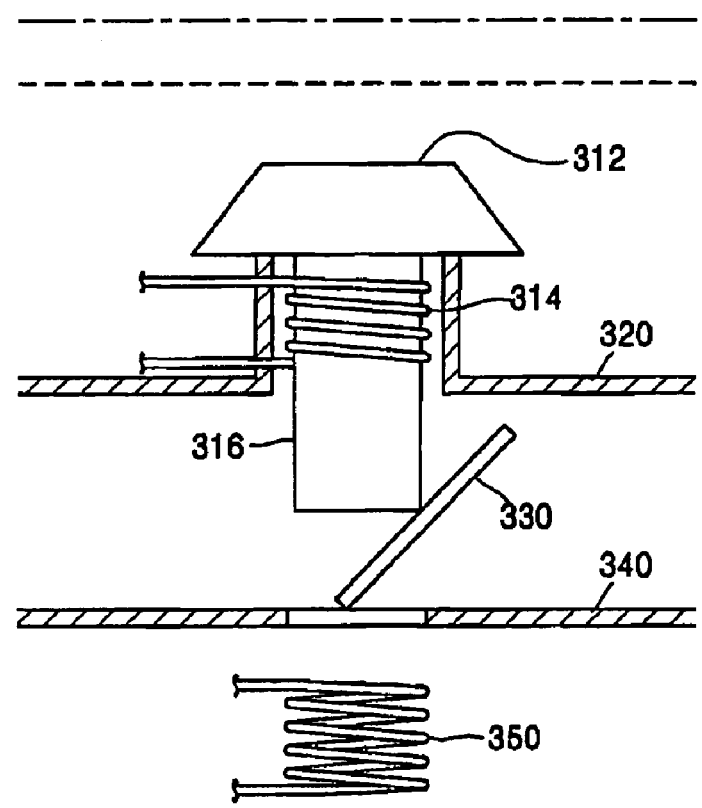
FIGS. 5A, 5B, and 5C illustrate cross-sectional views taken along line a-a' of FIG. 3 according to whether the lower magnetic element shown in FIG. 3 is driven, or whether the finger rest shown in FIG. 3 is pressed.
Figure 5B:
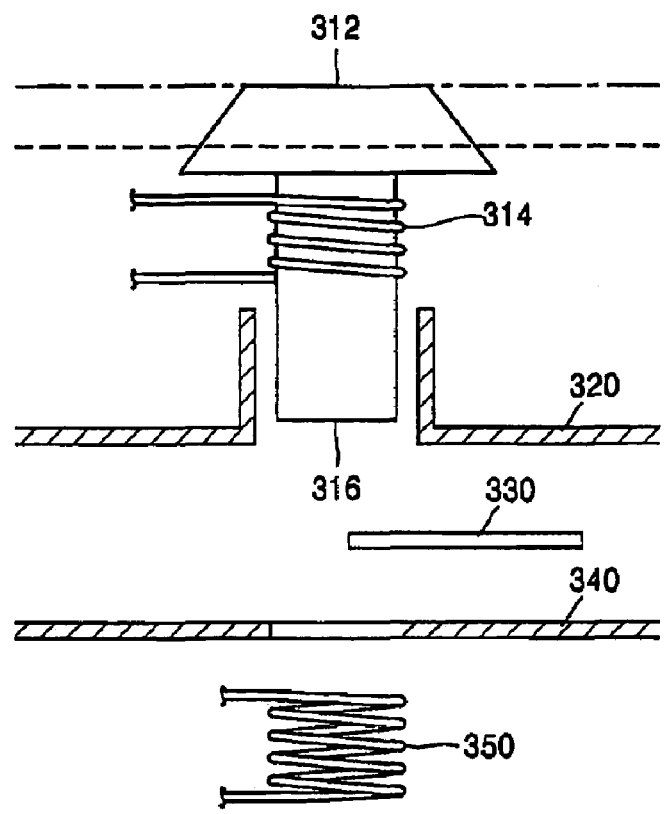
Figure 5C:
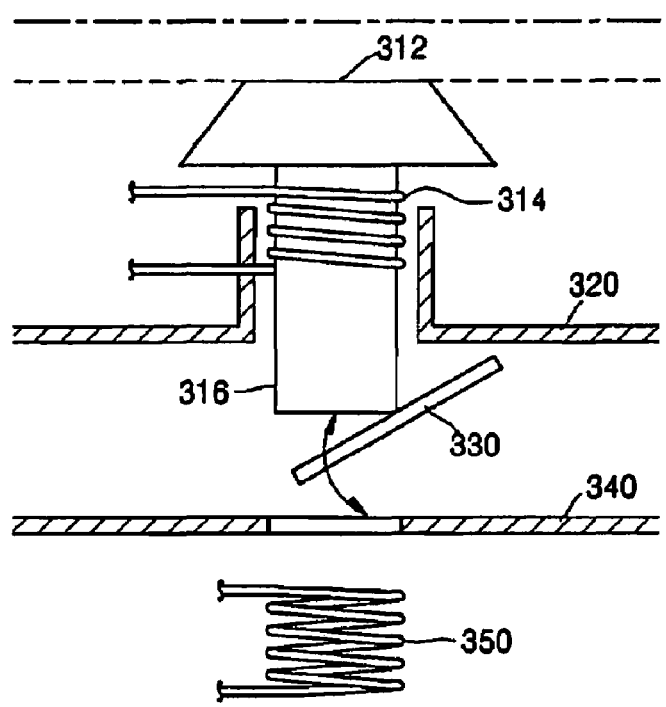

FIGS. 5A, 5B, and 5C illustrate cross-sectional views taken along line a-a' of FIG. 3 according to whether the lower magnetic element 350 shown in FIG. 3 is driven, or whether the finger rest 312 shown in FIG. 3 is pressed. An operating principle of FIG. 3 will now be described with reference to FIGS. 5A, 5B and 5C.

FIG. 5A illustrates a cross-sectional view taken along line a-a' of FIG. 3 when the lower magnetic element 350 is not driven. At this time, the magnetic controller 140 does not supply a current to the lower magnetic element 350, and, thus, there is no magnetic force between the upper magnetic element 314 and the lower magnetic element 350. As a result, the key is lowered due to gravity, and the switch 330 contacts the key recognizer 340. In this case, the key does not project from the key support 320.

The key recognition unit (not shown) connected to the key input apparatus continuously receives the same key value from the key recognizer 340 for a predetermined time. In this case, the key recognition unit recognizes that the key value is not actually inputted, and that the key is only not projected.

FIG. 5B illustrates a cross-sectional view taken along line a-a' of FIG. 3 when the lower magnetic element 350 is driven and the finger rest is not pressed. The magnetic controller 140 supplies a current to the lower magnetic element 350 such that a repulsive magnetic force exists between the upper magnetic element 314 and the lower magnetic element 350. As a result, a force is exerted upward that is equal to the difference between the magnetic force of the lower magnetic element 350 that is exerted in an upward direction and a summation force which is exerted in a downward direction. The finger rest 312 goes up to a point marked by a dash-dotted line in FIGS. 5A-5C. Herein, the summation force is made up of a force due to gravity applied to the key and the magnetic force of the upper magnetic element 314 that is exerted in a downward direction. In other words, the key is projected from the key support 320. In this case, the key recognizer 340 does not contact the switch 330, and thus the key recognition unit (not shown) connected to the key input apparatus does not receive any key value.

FIG. 5C illustrates a cross-sectional view taken along line a-a' of FIG. 3 when the lower magnetic element 350 is driven and the finger rest 312 is pressed. The force with which the user presses the finger rest 312 is referred to as a stroke force. In order to press the key, the user should press the finger rest 312 with a stroke force greater than the repulsive force between the upper magnetic element 314 and the lower magnetic element 350.

When the user presses the key, thereby moving the finger rest 312 down to a point marked by a dashed line in FIGS. 5A-5C, the pressing element 316 temporarily impacts, i.e., provides a stroke to, one end of the switch 330. As a result, the one end of the switch 330 contacts the key recognizer 340, and then separates from the key recognizer 340 in response to the user ending the pressing of the key. In this case, the key recognizer 340 contacts the switch 330, and, thus, the key recognition unit (not shown) connected to the key input apparatus does receive the key value.

Figure 6:
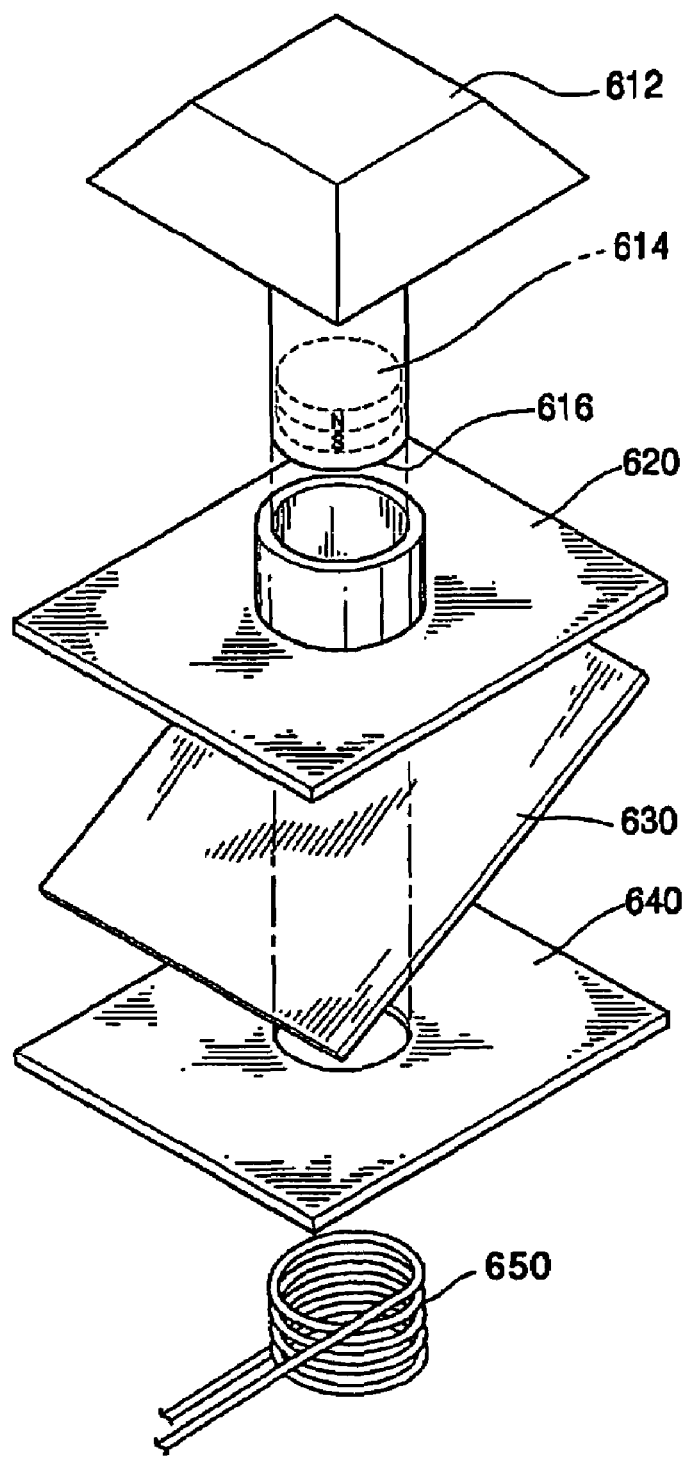
FIG. 6 is an exploded perspective view illustrating another example of the user interface and key recognizer shown in FIG. 1 according to another embodiment of the present invention.
Figure 7:
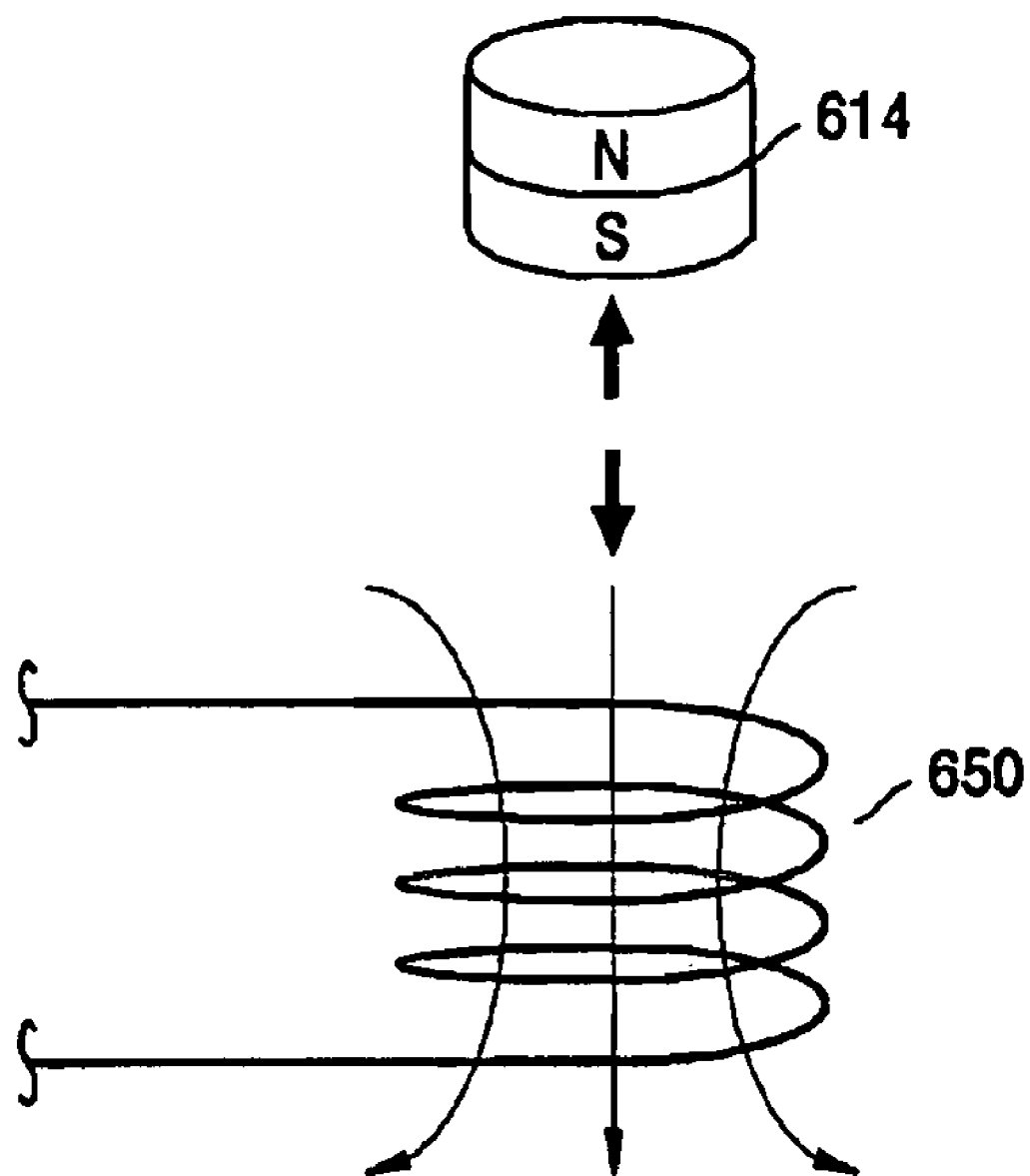
FIG. 7 is a reference diagram illustrating a repulsive force exerted between the lower magnetic element and the upper magnetic element shown in FIG. 6.

FIG. 6 is an exploded perspective view illustrating another example of the user interface and key recognizer shown in FIG. 1. Here, reference number 612 represents the finger rest 212, 222, 232, 242, or 252, reference number 614 represents the upper magnetic element 214, 224, 234, 244, or 254, reference number 616 represents the pressing element 216, 226, 236, 246, or 256, and reference number 640 represents the key recognizer 120, Reference number 650, shown in FIG. 7, represents the lower magnetic element 218, 228, 238, 248, or 258, respectively.

Referring to FIG. 6, a key, including the finger rest 612 providing a pressable space for the user and the pressing element 616, is inserted into a hole formed in a key support 620.

The upper magnetic element 614 is a permanent magnet.

Operations of the finger rest 612, the pressing element 616, the key support 620, a switch 630, the key recognizer 640, and the lower magnetic element 650 shown in FIG. 6 are similar to those of the finger rest 312, the pressing element 316, the key support 320, the switch 330, the key recognizer 340, and the lower magnetic element 350 shown in FIG. 3, respectively.

FIG. 7 is a reference diagram illustrating a repulsive force exerted between the lower magnetic element 650 and the upper magnetic element 614 comprising the permanent magnet shown in FIG. 6. The upper magnetic element 614 is disposed with a north pole directed upward and a south pole directed downward, and the lower magnetic element 650 has a south pole directed upward and a north pole directed downward. Therefore, a repulsive force is exerted between the lower magnetic element 650 and the upper magnetic element 614 in response to a current being supplied to the lower magnetic element 650.

The magnetic controller 140 controls a value of the (electric) current supplied to the lower magnetic element 650, such that the extent to which the key is projected, that is, the height of the key relative to other keys, can be controlled. The number of permanent magnets constituting the upper magnetic element 614, and the distance between the permanent magnet and the lower magnetic element 650 are also factors determining the key height.

Figure 8:
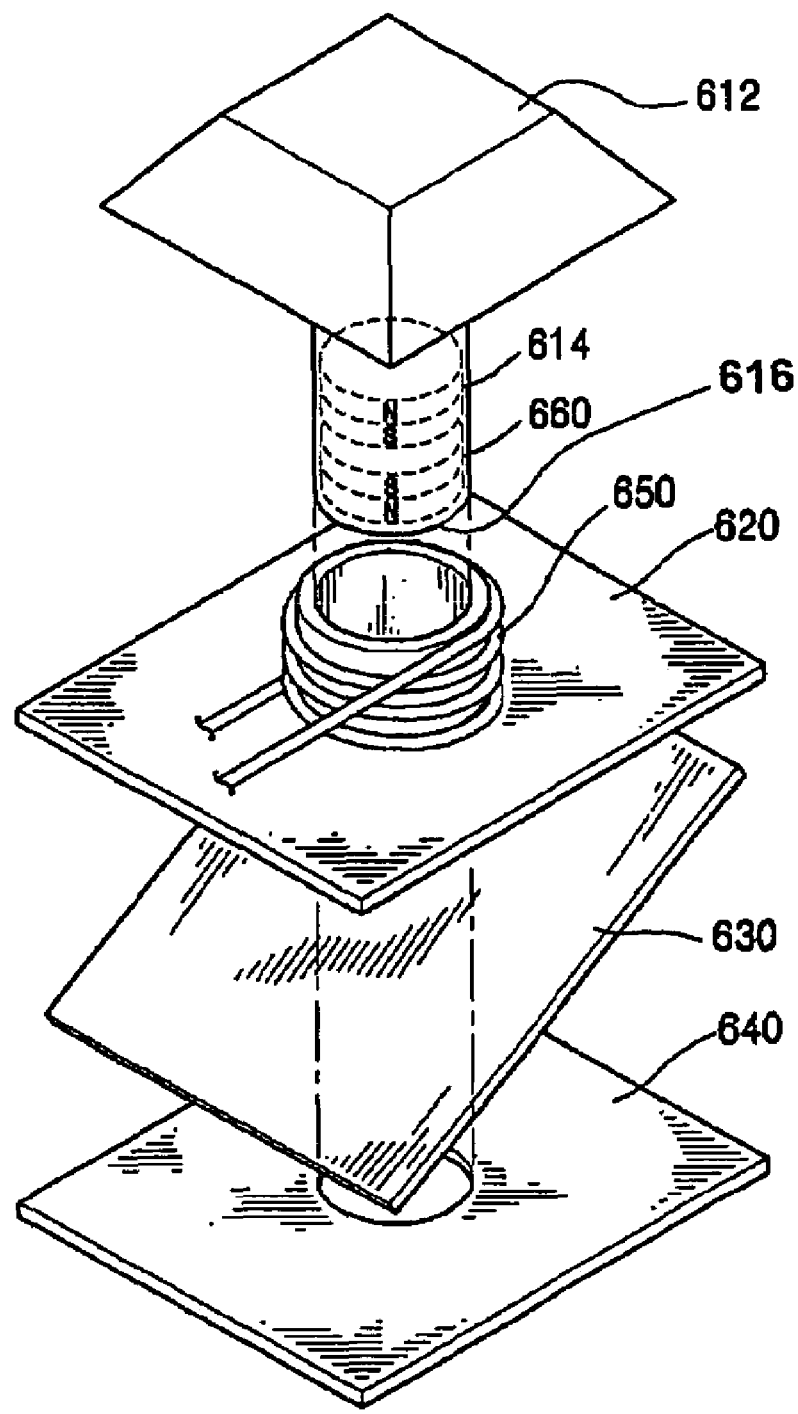
FIG. 8 is an exploded perspective view illustrating yet another example of the user interface and key recognizer shown in FIG. 1.

FIG. 8 is an exploded perspective view illustrating yet another example of the user interface and key recognizer shown in FIG. 1. The user interface and key recognizer shown in FIG. 8 are identical to those shown in FIG. 6, except that the upper magnetic element includes first and second permanent magnets 614 and 660.

Referring to FIG. 8, a key, including the finger rest 612 providing a pressable space for the user and the pressing element 616, is inserted into a hole formed in a key support 620.

Operations of the finger rest 612, the pressing element 616, the key support 620, a switch 630, the key recognizer 640, and the lower magnetic element 650 shown in FIG. 8 are similar to those of the finger rest 312, the pressing element 316, the key support 320, the switch 330, the key recognizer 340 and the lower magnetic element 350 shown in FIG. 3, respectively.

However, referring to FIG. 8, the upper magnetic element includes the permanent magnets 614 and 660. Here, the permanent magnet 614 has a north pole directed upward and a south pole directed downward, while the permanent magnet 660 has a south pole directed upward and a north pole directed downward. Further, the magnetic controller 140 controls the lower magnetic element 650 such that a (electric) current flows to an electromagnet constituting the lower magnetic element 650 to establish a south pole directed upward and a north pole directed downward. While the pressing element 616 presses the switch 630, the permanent magnet 660 is enclosed by the electromagnet 650.

Compared to the examples described above, the magnetic force which the upper magnetic elements 614 and 660 apply to the lower magnetic element 650 is stronger, and, thus, a repulsive force between the upper magnetic elements 614 and 660 and the lower magnetic element 650 is stronger.

Figure 9:
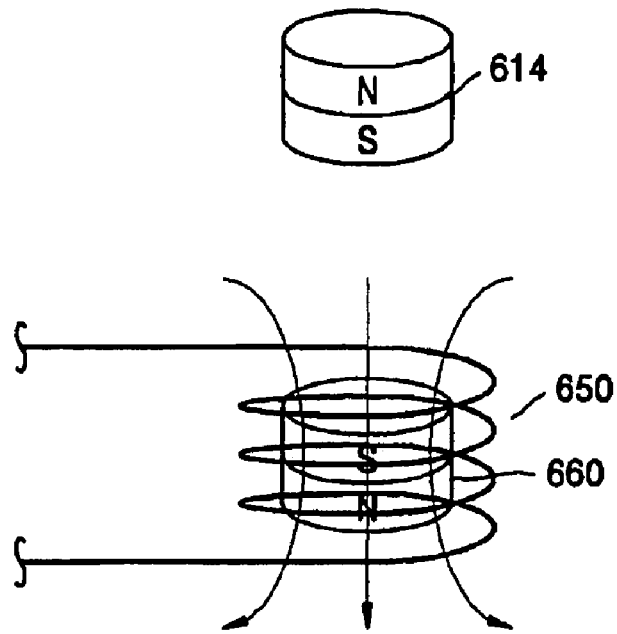
FIG. 9 is a reference diagram illustrating forces exerted between the upper and lower magnetic elements shown in FIG. 8.

FIG. 9 is a reference diagram illustrating the forces exerted between the first and second permanent magnets 614 and 660 and the electromagnet 650 shown in FIG. 8. The first permanent magnet 614 is established with a north pole directed upward and a south pole directed downward, while each of the lower magnetic element 650 and the second permanent magnet 660 has a south pole directed upward and a north pole directed downward. Therefore, a repulsive force is exerted between the lower magnetic element 650 and the upper magnetic elements 614 and 660.

The magnetic controller 140 controls the current supplied to the electromagnet 650, thereby controlling the height of each of the keys. The number of the permanent magnets and the distance between the permanent magnets are also factors determining the extent to which the key is projected.

The magnetic controller 140 may generate a magnetic control signal to control the lower magnetic element 350 or 650 and/or the upper magnetic element 314 or 614 to increase or decrease at least one of the magnetic fields produced by the lower magnetic element 350 or 650 and the upper magnetic element 314 or 614 a predetermined number of times during a predetermined period after the key is pressed.

Figure 10:
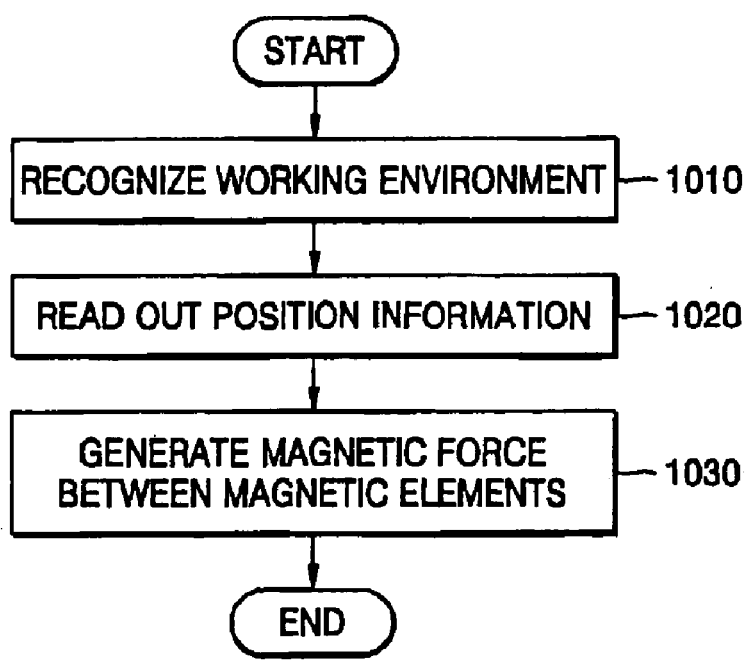
FIG. 10 is a flow chart illustrating a method of operating a key input apparatus using a magnetic force according to an embodiment of the present invention.

FIG. 10 is a flow chart illustrating a method of operating a key input apparatus using a magnetic force according to an embodiment of the present invention. The method includes recognizing a working environment (1010), reading position information (1020), and generating a magnetic force between magnetic elements (1030).

Assuming that the lower magnetic element 350 or 650 is an electromagnet, the operating method illustrated in FIG. 10 will now be described.

Referring to FIG. 10, the magnetic controller 140 recognizes the working environment (1010). More specifically, the magnetic controller 140 may be connected to a face recognition device or an iris recognition device or may recognize user information inputted from the user.

Further, the magnetic controller 140 may recognize what kind of work the user intends to carry out, such as drafting a document, playing a game, or so forth.

After recognizing the working environment, the magnetic controller 140 reads the position information corresponding to the recognized working environment from the magnetic control value storage 160 (1020). The position information refers to information regarding the position of at least one key to be projected upward among a plurality of keys.

After reading the position information, the magnetic controller 140 supplies a current only to the lower magnetic element 350 or 650 of the key or keys corresponding to the read position information. Thus, only the key or keys corresponding to the read position information are projected (1030). If the upper magnetic element 314 is an electromagnet, current may also be supplied to the upper magnetic elements corresponding to the key or keys for which the lower magnetic elements 350 or 650 are supplied current.

When the magnetic controller 140 cannot read position information corresponding to the recognized working environment from the magnetic control value storage 160, the magnetic controller 140 may learn working characteristics of the user for a predetermined time, and then generate environment information using the learned working characteristics. The generated environment information can be stored in the magnetic control value storage 160. The working characteristics of the user refers to the extent to which the user uses each of the keys of the key input apparatus. Preferably, though not necessarily, the keys which the user mainly uses refers to keys which have been pressed a number of times exceeding a critical pressed number of times within a predetermined time.

Figure 11:
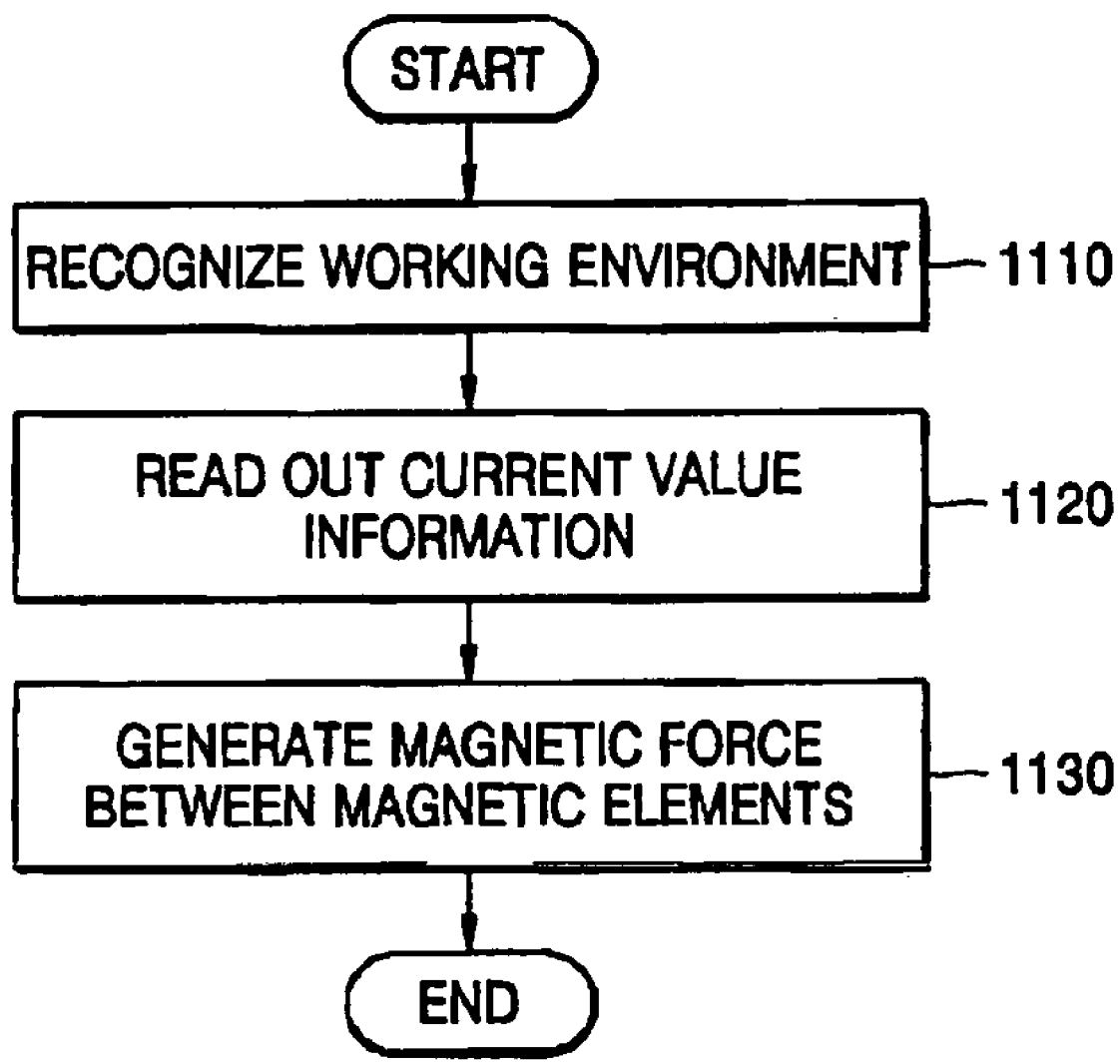
FIG. 11 is a flow chart illustrating a method of operating a key input apparatus using a magnetic force according to another embodiment of the present invention.

FIG. 11 is a flow chart illustrating a method of operating a key input apparatus using a magnetic force according to another embodiment of the present invention. The method includes recognizing a working environment (1110), reading information regarding current (1120), and generating a magnetic force between magnetic elements (1130). For the case in which the lower magnetic element 350 or 650 and the upper magnetic element 314 or 614 are electromagnets, the operating method illustrated in FIG. 11 will now be described.

Referring to FIG. 11, the magnetic controller 140 recognizes the working environment (1110). Then, the magnetic controller 140 reads information regarding the current corresponding to the recognized working environment from the magnetic control value storage 160 (1120). The current information refers to information regarding the current to be supplied to the lower magnetic element 350 or 650 and the upper magnetic element 314 or 614.

Upon reading the current information, the magnetic controller 140 supplies a current corresponding to the read current information to the lower magnetic element 350 and the upper magnetic element 314 (1130). The magnitude of a repulsive force between the lower magnetic element 350 and the upper magnetic element 314 depends on the supplied current. The force required to perform a stroke varies according to the user and his/her fingers. The magnetic controller 140 can control the repulsive force such that it is equal to the force required to perform a stroke. For example, the repulsive force can be controlled to equal the gravitational force corresponding to a mass of 35 g, 45 g or 55 g.

When the magnetic controller 140 cannot read the current value information corresponding to the recognized working environment from the magnetic control value storage 160, the magnetic controller 140 may learn working characteristics of the user during a predetermined time, and then generate environment information using the learned working characteristics. The generated environment information can be stored in the magnetic control value storage 160. The working characteristics of the user refers to the extent to which the user presses each of the keys of the key input apparatus. Further, the force with which the user predominantly presses each key may be determined as, preferably, though not necessarily, an average value of the forces applied to each key during a predetermined time.

Figure 12:
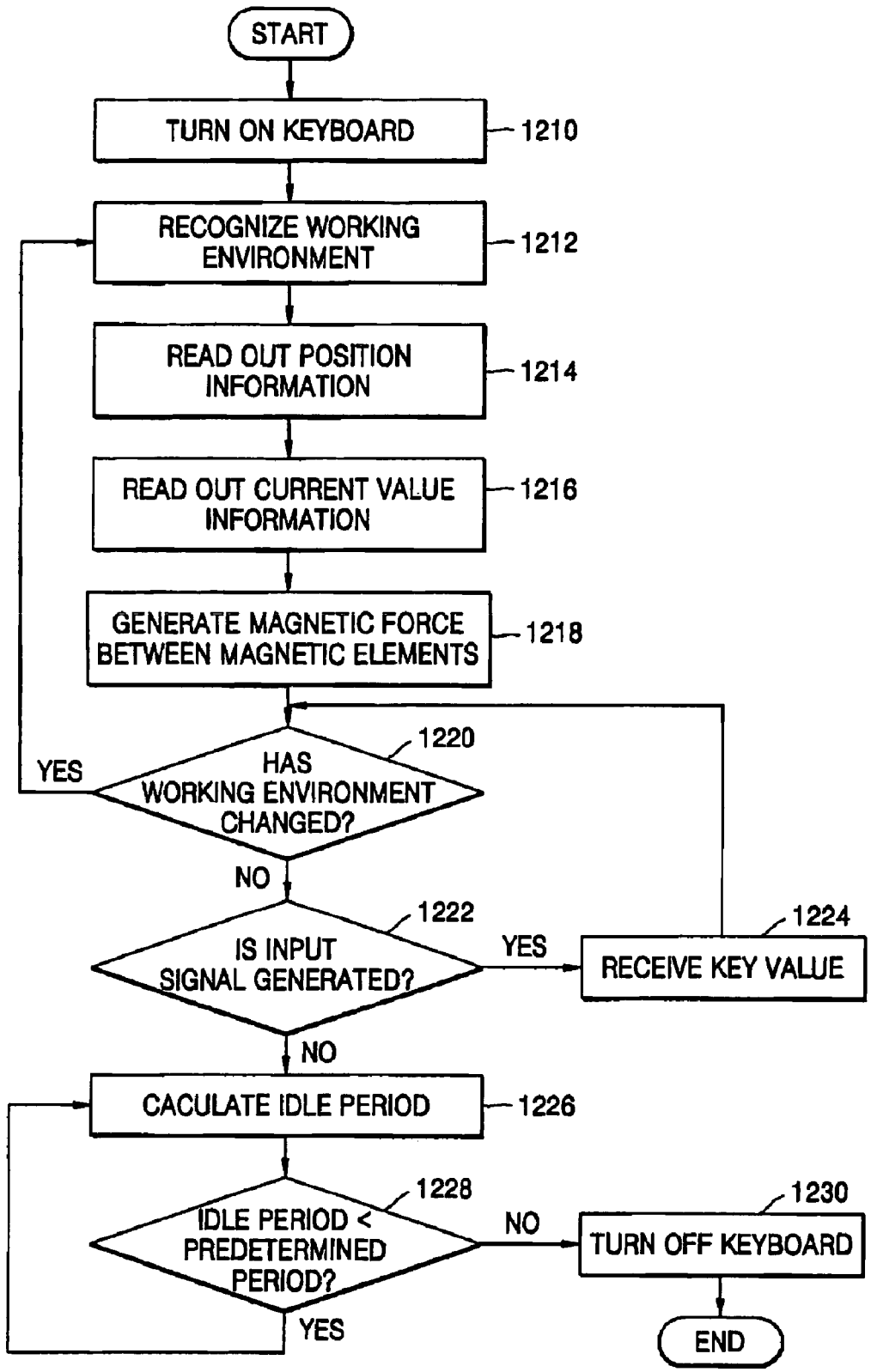
FIG. 12 is a flow chart illustrating a method of operating a key input apparatus using a magnetic force according to yet another embodiment of the present invention.

FIG. 12 is a flow chart illustrating a method of operating a key input apparatus using a magnetic force according to another embodiment of the present invention. The method includes recognizing a working environment to determine a magnetic force to be generated between magnetic elements (1210 through 1218), determining whether the working environment has changed and whether an input signal is generated (1220 through 1224), and calculating an idle period to determine whether to turn a keyboard off (1226 through 1230).

Assuming that the key input apparatus is a keyboard composed of a plurality of keys, and that the lower magnetic element 350 and the upper magnetic element 314 are electromagnets, the operating method illustrated in FIG. 12 will now be described.

Referring to FIG. 12, the keyboard is turned on (1210), and then the magnetic controller 140 recognizes the working environment (1212). The keyboard and a key recognition device connected to the keyboard can be turned on simultaneously.

The magnetic controller 140 then reads position information and current information from the magnetic control value storage 160 (1214 and 1216). Both the position information and the current information are related to the detected working environment. The magnetic controller 140 causes specified keys to be projected upward according to the read position information (1218), and supplies current to the lower magnetic elements 350 and the upper magnetic elements 314 of the specified keys according to the read current information (1218).

The magnetic controller 140 determines whether the working environment has changed at predetermined time intervals (1220). The intervals can be regular. When the magnetic controller 140 determines that the working environment has changed, the magnetic controller 140 recognizes the working environment again (1212). Then, operations 1212 through 1218 are repeated.

On the other hand, when the magnetic controller 140 determines that the working environment has not changed, it is determined whether the user presses a key (1222).

When the user presses a key, an input signal is generated, and the key recognizer 120 receives the value of a key and enters a standby state to receive a new input signal.

On the other hand, when a key is not pressed and an input signal is not generated for a predetermined period, the magnetic controller 140 measures an idle period (1226). When the idle period is greater than or equal to a predetermined length of time (1228), the keyboard is turned off (1230).

Figure 13:
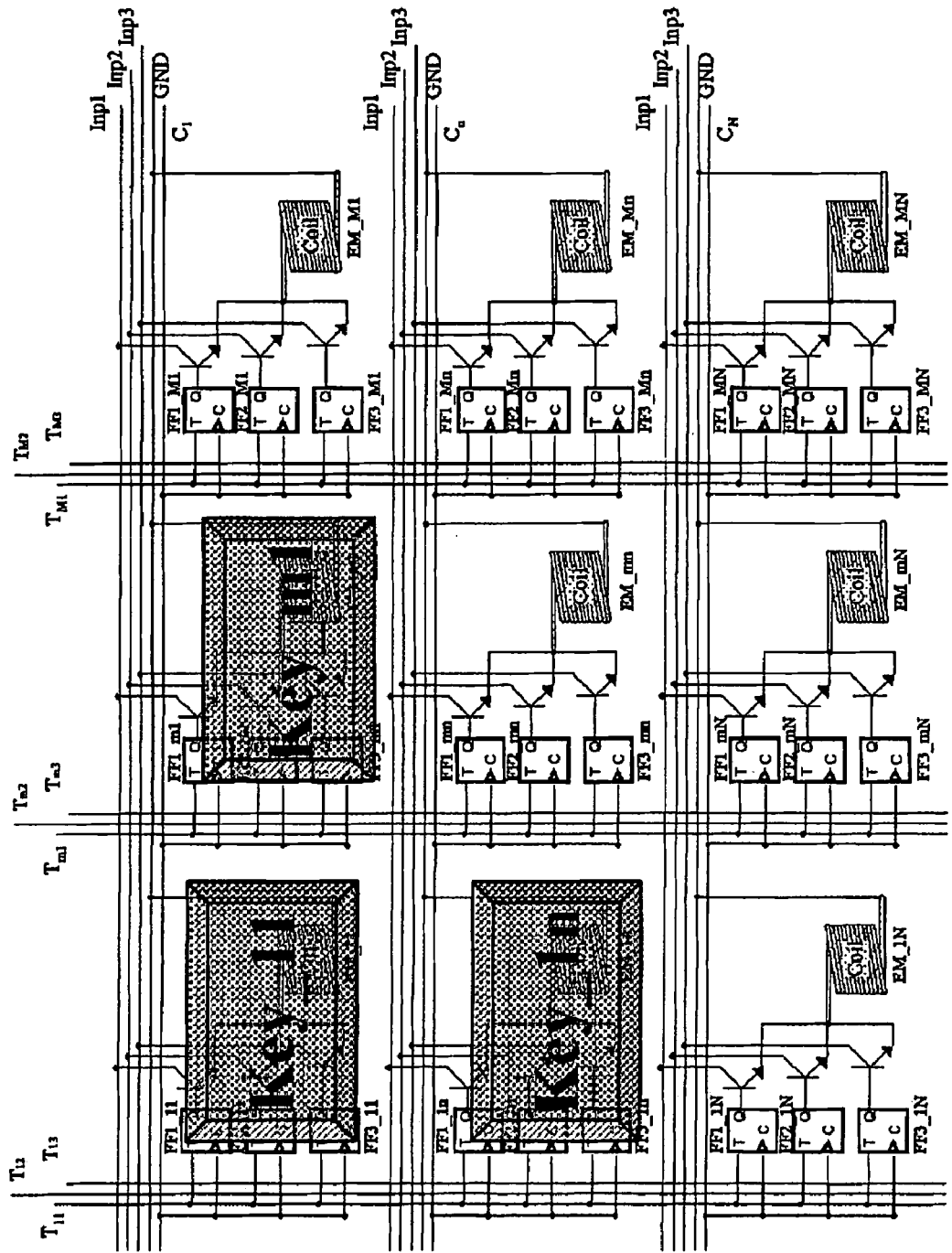
FIG. 13 is a circuit diagram illustrating a key input apparatus according to an embodiment of the present invention.

FIG. 13 is a circuit diagram illustrating a key input apparatus according to an embodiment of the present invention. The key input apparatus shown in FIG. 13 is a keyboard having N×M keys arranged in an N×M matrix. Thus, the number of lower magnetic elements 350 or 650 is N×M.

Figure 14:
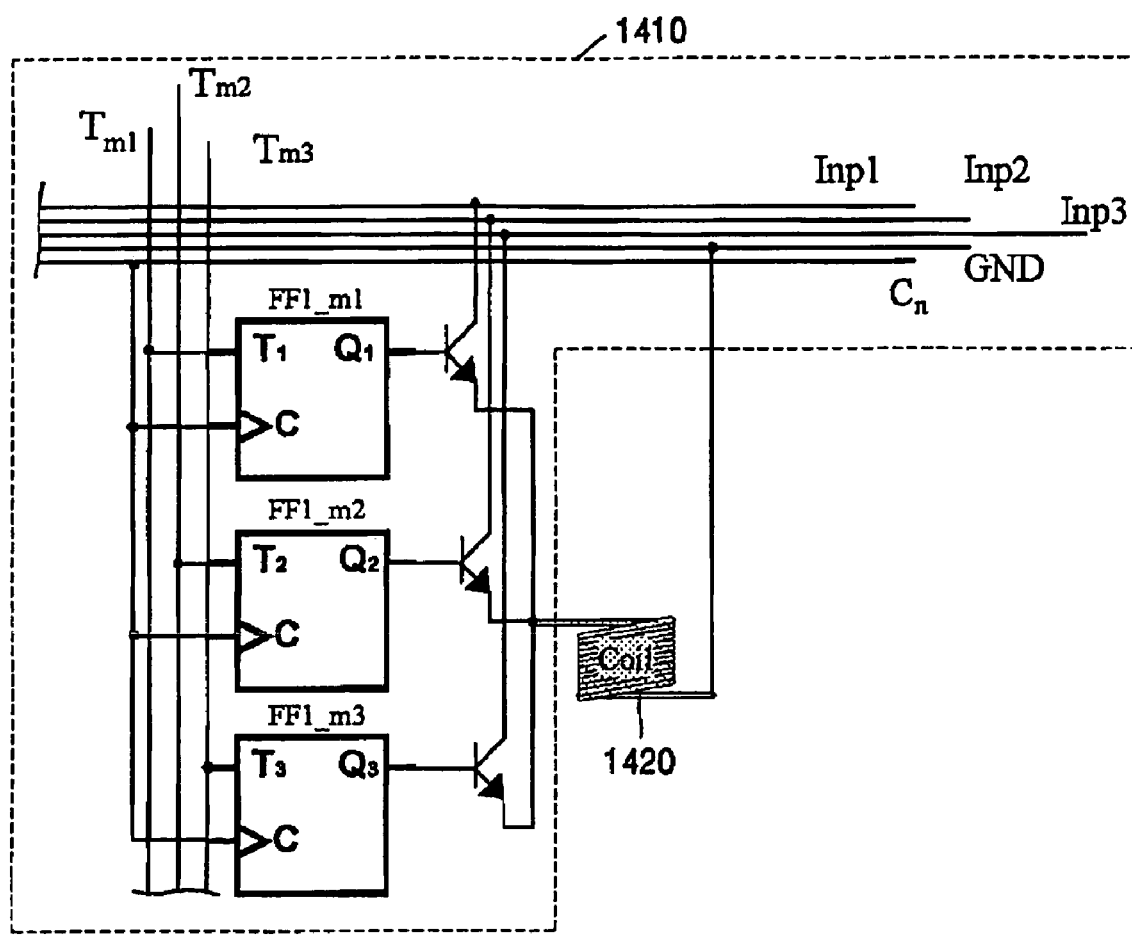
FIG. 14 is a circuit diagram illustrating a lower magnetic element shown in FIG. 13.

FIG. 14 is a circuit diagram illustrating a lower magnetic element shown in FIG. 13. Hereinafter, the operation of the lower magnetic element 350 or 650 will be described with reference to FIG. 14. The lower magnetic element 350 or 650 is composed of a coil 1420 connected to a potential at one end, and at least one switch 1410 connected between the other end of the coil 1420 and two or more current sources, to be switched in response to binary data.

In detail, the lower magnetic element 350 or 650 includes at least one flip-flop to receive the binary data, at least one transistor having a base connected to an output terminal of the flip-flop and a collector through which a predetermined current flows, and the coil, one end of the coil being connected to an emitter of the transistor and the other end of the coil on the other side thereof. FIG. 14 is a circuit diagram of the lower magnetic element 350 or 650 of the key located in the n-th column and m-th row of the key input apparatus. The flip-flop in FIG. 14 is a T flip-flop for convenience of description but is not limited thereto.

In FIG. 14, there are flip-flops and three transistors for convenience of description, but the input key device of the present embodiment is not limited thereto. In FIGS. 13 and 14, because the number of flip-flops is 3, there are three magnitudes of the magnetic force which the lower magnetic element 350 can apply to the upper magnetic element 314 or 614.

Preferably, though not necessarily, only one of a plurality of output terminals Q1, Q2, and Q3 of the flip-flop outputs a signal having logic 1. Only the transistor connected to the output terminal of the flip-flop from which 1 is outputted is turned on.

The collector terminals of the transistors are respectively connected to current sources Inp1 through Inp3. A predetermined current flows through each of the current sources Inp1 through Inp3. Meanwhile, a predetermined clock signal corresponding to the n-th column is input through a terminal Cn.

Consequently, for example, when only the output terminal Q2 outputs 1, the current flowing through the coil is supplied from the current source Inp2. This current causes the lower magnetic element 350 or 650 to apply a magnetic force to the upper magnetic element 314 or 614.

In order to change the current flowing through the coil to the current supplied from the current source Inp3, the outputs of the output terminals Q1, Q2, and Q3 of the flip-flop should be 0, 0, and 1, respectively. To this end, the outputs of the terminals Q2 and Q3 are switched, and thus the inputs of the terminals T2, T3, and C should be switched from 1 to 0.

As set forth above, the key input apparatus is operated by a magnetic force. Hence, the key input apparatus projects only the keys which the user uses among from the plurality of keys of the key input apparatus, and the user presses the keys with only the stroke force which the user typically uses. When the user presses the key, he/she can feel himself/herself press the key. Thus, it is possible to easily input key values through the key input apparatus which has less than an entirety of the keys projected.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A key input apparatus comprising:
   at least one pressable key;
   a lower magnetic element to selectively produce a predetermined first magnetic field;
   an upper magnetic element to support the key and selectively produce a predetermined second magnetic field, thereby applying a repulsive magnetic force to the lower magnetic element;

a magnetic controller to generate a magnetic control signal to control at least one of the first magnetic field and the second magnetic field, wherein the magnetic control signal is based on key position information corresponding to a working environment determined from external input that includes at east one of data indicating an identity of a predetermined user among a plurality of users and data indicating an application from among a plurality of applications; and a key recognizer to recognize a value of the pressed key.

2. The key input apparatus of claim 1, wherein the magnetic controller generates the magnetic control signal to control the first magnetic field and the second magnetic field based on a stored control value.

3. The key input apparatus of claim 1, wherein the key recognizer determines an average extent to which the key is pressed in a predetermined period of time; and the magnetic controller generates the magnetic control signal to control the first magnetic field and the second magnetic field based on the determined average extent.

4. The key input apparatus of claim 3, further comprising a magnetic control value storage to store the average extent determined by the key recognizer.

5. The key input apparatus of claim 1, wherein the magnetic controller controls a current flowing to the upper magnetic element; and the upper magnetic element is an electromagnet.

6. The key input apparatus of claim 1, wherein the magnetic controller controls a current flowing to the lower magnetic element; and the lower magnetic element is an electromagnet.

7. The key input apparatus of claim 1, wherein the magnetic controller generates the magnetic control signal to control the first magnetic field;

the upper magnetic element comprises a permanent magnet; and the second magnetic field is constant.

8. The key input apparatus of claim 1, wherein the magnetic controller generates the magnetic control signal to control the lower magnetic element and the upper magnetic element to increase or decrease a value of the repulsive magnetic force a predetermined amount during a predetermined time after the key is pressed.

9. The key input apparatus of claim 1, wherein the lower magnetic element includes:

a coil having a potential at a first end; and at least one switch arranged between a second end of the coil and at least two current sources, the switch being switched in response to binary data.

10. A key input apparatus comprising:

at least one pressable key;

a first magnetic element to selectively produce a first magnetic field;

a second magnetic element to support the pressable key and produce a second magnetic field which repulses the first magnetic field; and a controller to generate a magnetic control signal to control at least one of the first and second magnetic fields, wherein the magnetic control signal is based on key height information corresponding to a recognized working environment determined from external input that includes at least one of data indicating an identity of a predetermined riser among a plurality of users and data indicating an application from among a plurality of applications.

11. The apparatus of claim 10, wherein the first magnetic element is an electromagnet, and the controller controls the first magnetic field by selectively applying electric current to the electromagnet.

12. The apparatus of claim 11, wherein the second magnetic element is an electromagnet, and the controller controls the second magnetic field by selectively applying electric current to the electromagnet.

13. The apparatus of claim 11, wherein the second magnetic element is a permanent magnet.

14. The apparatus of claim 10, wherein the controller controls the first and/or second magnetic fields according to stored values.

15. The apparatus of claim 10, wherein the controller controls the first and/or second magnetic fields according to values learned from interaction with a user.

16. The apparatus of claim 10, wherein the controller controls the first and/or second magnetic fields according to a determined work environment.

17. The key input apparatus of claim 1, wherein when the magnetic controller cannot read key position information corresponding to the working environment, the magnetic controller learns working characteristics of a user over a predetermined period of time.

18. A key input apparatus comprising:

at least one pressable key;

a lower magnetic element to selectively produce a predetermined first magnetic field;

an upper magnetic element to support the key and selectively produce a predetermined second magnetic field thereby applying a repulsive magnetic force to the lower magnetic element;

a magnetic controller to generate a magnetic control signal to control at least one of the first magnetic field and the second magnetic field, the magnetic control signal based on key position information corresponding to a working environment determined from external input, and wherein the magnetic controller controls the first magnetic field or the second magnetic field, or both, according to working characteristics of a user obtained over a predetermined period of time.

* * * * *

UNITED STATES PATENT AND TRADEMARK OFFICE
CERTIFICATE OF CORRECTION

PATENT NO. : 7,667,623 B2  Page 1 of 1
APPLICATION NO. : 11/285191
DATED : February 23, 2010
INVENTOR(S) : Byung-Seok Soh et al.

It is certified that error appears in the above-identified patent and that said Letters Patent is hereby corrected as shown below:

Column 14, Line 10, change "riser" to --user--.

Column 14, Line 42, change "field" to --field,--.

Column 14, Line 47, after "signal" insert --being--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,667,623 B2
APPLICATION NO. : 11/285191
DATED : February 23, 2010
INVENTOR(S) : Soh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Twenty-eighth Day of December, 2010

David J. Kappos
*Director of the United States Patent and Trademark Office*